United States Patent
Landschaft et al.

(10) Patent No.: US 8,724,791 B2
(45) Date of Patent: May 13, 2014

(54) CONTROLLING A CALL SETUP PROCESS

(75) Inventors: Assaf Landschaft, Munich (DE); Bernd Hochmuth, Munich (DE)

(73) Assignee: LSI Corporation, Milpitas, CA (US)

( * ) Notice: Subject to any disclaimer, the term of this patent is extended or adjusted under 35 U.S.C. 154(b) by 361 days.

(21) Appl. No.: 12/668,796

(22) PCT Filed: Jul. 12, 2007

(86) PCT No.: PCT/EP2007/057212
§ 371 (c)(1),
(2), (4) Date: Jan. 12, 2011

(87) PCT Pub. No.: WO2009/006945
PCT Pub. Date: Jan. 15, 2009

(65) Prior Publication Data
US 2011/0123012 A1    May 26, 2011

(51) Int. Cl.
*H04M 3/42*    (2006.01)
*H04M 7/00*    (2006.01)

(52) U.S. Cl.
USPC .................. 379/220.01; 379/210.01

(58) Field of Classification Search
USPC ............... 379/88.01–88.25, 202.01, 204.01, 379/265.09; 370/352
See application file for complete search history.

(56) References Cited

U.S. PATENT DOCUMENTS

| | | | |
|---|---|---|---|
| 4,371,752 A | 2/1983 | Matthews et al. | |
| 6,295,447 B1 | 9/2001 | Reichelt et al. | |
| 2002/0118808 A1* | 8/2002 | Kelleher et al. | 379/202.01 |
| 2005/0013429 A1* | 1/2005 | Bensman | 379/377 |
| 2010/0189249 A1* | 7/2010 | Shah et al. | 379/265.09 |
| 2011/0225631 A1* | 9/2011 | Pearson et al. | 726/4 |

FOREIGN PATENT DOCUMENTS

| | | |
|---|---|---|
| EP | 1675421 A1 | 6/2006 |
| WO | 9918704 | 4/1999 |
| WO | 2009006945 A1 | 1/2009 |

OTHER PUBLICATIONS

Digital cellular telecommunications system (Phase 2+); Universal Mobile Telecommunications System (UMTS); Call Forwarding supplementary service; Stage 3; 2004; 37 pages.
PCT/EP2007/057212; International Search Report dated Apr. 3, 2008.

* cited by examiner

*Primary Examiner* — Mohammad Islam

(57) ABSTRACT

A call setup process (28) in a telecommunication device (10) is controlled, wherein the telecommunication device (10) receives a user command (22) to set up a call, initiates the call setup process (28), determines that the call is likely to reach a voicemail system (14), and, in response to the determination that the call is likely to reach the voicemail system (14), automatically terminates the call setup process (28). A telecommunication device (10) comprises related features. A telecommunication network (12) is adapted to support or implement a determination whether or not an incoming call is forwarded to the voicemail system (14). The invention improves the user experience if a called party does not personally answer a telephone call.

20 Claims, 1 Drawing Sheet

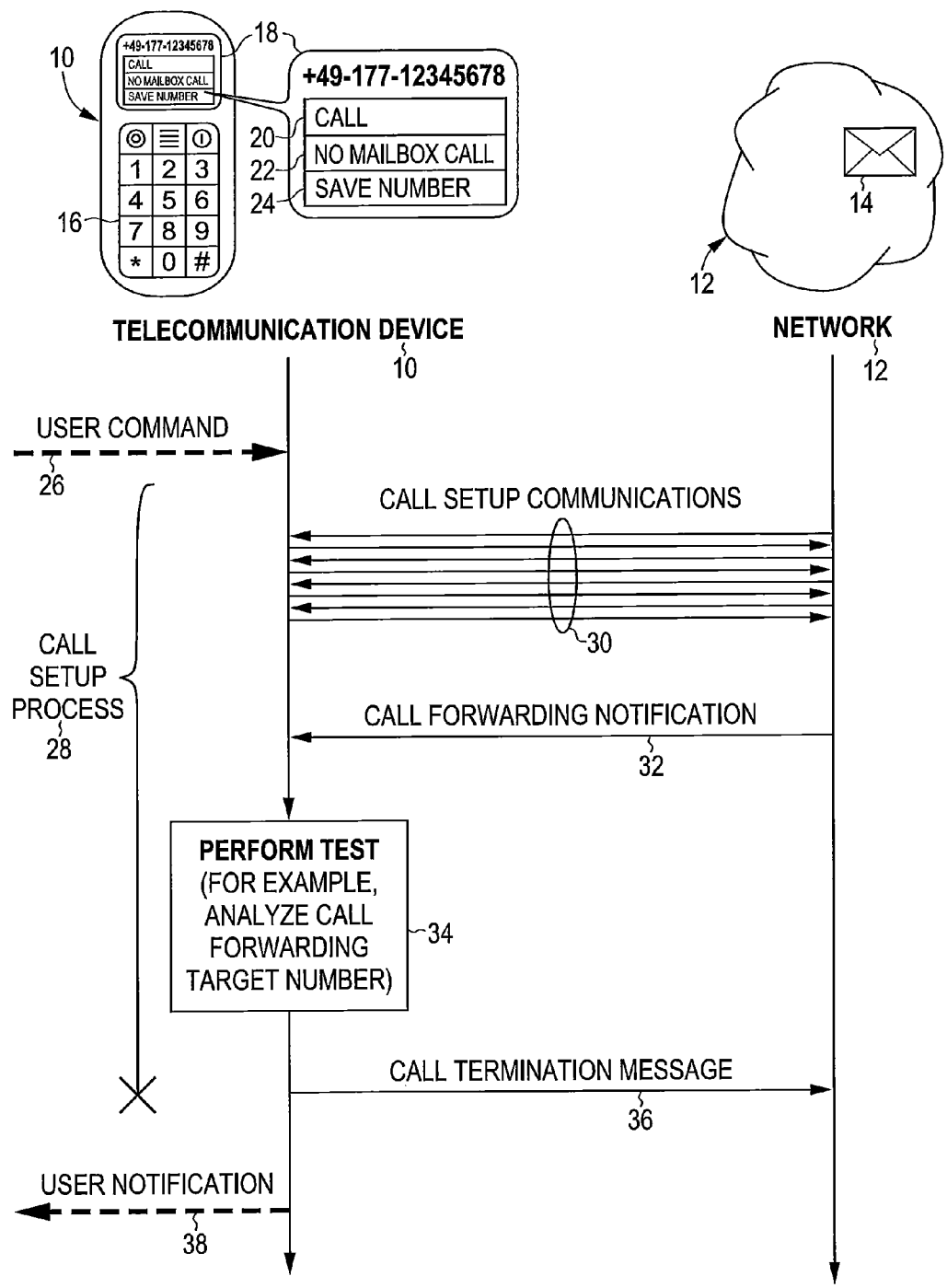

CONTROLLING A CALL SETUP PROCESS

CROSS-REFERENCE TO RELATED APPLICATION

This application claims the benefit of International Application No. PCT/EP 2007/057212, filed on Jul. 12, 2007, entitled "Controlling a Call Setup Process," commonly assigned with this application and incorporated herein by reference.

TECHNICAL FIELD

The invention generally relates to the technical field of telecommunications. In particular, the invention relates to the field of controlling a call setup process in a telecommunication device and/or a telecommunication network.

BACKGROUND

Voicemail systems have become ubiquitous in modern telecommunication networks. For example, U.S. Pat. No. 4,371,752 shows an early voicemail system that evolved into the systems of today.

As common daily experience shows, many users do not wish to leave a message when they reach a voicemail system. Some people never leave messages at all as a matter of principle. Other people feel insecure in having their massage recorded and therefore hang up unless there is a very pressing matter. Even people who are generally comfortable with the use of voicemail systems may wish to avoid leaving messages in certain situations.

Calls that reach a voicemail system are generally charged even if the caller does not leave any message. There is often a minimum fee that is incurred as soon as the call is connected, even if the caller hangs up after a few seconds when realizing that a voicemail system answered the call. Furthermore, there is often a greeting message which the owner of a mailbox has recorded in his or her own voice. It may take some time for the caller to listen to this greeting message and realize that only the voicemail system has answered. The caller pays for this time. This may annoy the caller and may lower the attractiveness of using certain telecommunication services and networks.

There is therefore a need for providing a better user experience with respect to voicemail systems.

SUMMARY

It is an object of the present invention to provide a technique that avoids at least some of the problems of the prior art and provides a better user experience if a called party does not personally answer a telephone call.

Certain embodiments of the invention provide a method for controlling a call setup process in a telecommunication device, wherein the telecommunication device is a user device, the method comprising: (1) receiving a user command to set up a call, (2) initiating the call setup process, (3) determining that the call is likely to reach a voicemail system, wherein the telecommunication device determines that the call is likely to reach a voicemail system if the telecommunication device receives a call forwarding notification and (4) in response to the determination that the call is likely to reach the voicemail system, terminating the call setup process.

Certain embodiments of the invention provide a method for controlling a call setup process in a telecommunication device, wherein the telecommunication device is a user device, the method comprising: (1) receiving a user command to set up a call, (2) initiating the call setup process, (3) determining that the call is likely to reach a voicemail system, wherein the telecommunication device determines that the call is likely to reach a voicemail system if the telecommunication device receives a call forwarding notification that passes at least one test performed by the telecommunication device and (4) in response to the determination that the call is likely to reach the voicemail system, automatically terminating the call setup process.

Certain embodiments of the invention provide a telecommunication device that is adapted for performing any of the above methods.

The present invention is based on the insight that a caller often knows in advance that he or she will not leave a message in a voicemail system if a called person is not available. The invention therefore teaches to control a call setup process in a way that, if it is determined that the call is likely to reach a voicemail system, the call setup process will be automatically terminated. Preferably, this termination takes place before any connection is established, thus avoiding any unnecessary connection of the call to the voicemail system. Even in cases where the automatic termination of the call is too late to avoid establishing a connection, the call is still terminated as soon as possible, thus reducing the connection time. The calling party thereby saves various kinds of communication costs, i.e., not only connection charges, but also battery power (if calling from a mobile device) and time.

All in all, the present invention considerably improves the user experience of a caller because the invention avoids unnecessary and wasteful call connections. Furthermore, it is expected that any initial loss of fees at the side of the network operators will be more than made up by the increased attractiveness of the service.

In some embodiments of the invention, the telecommunication device determines whether or not the call is likely to reach a voicemail system. It is understood that this determination may not always be accurate. Therefore the wording "is likely" is intended to mean that a predefined criterion or more than one predefined criteria is/are fulfilled, the criterion/criteria being typical for calls that reach a voicemail system.

As mentioned above, an exact determination whether or not the call will reach a voicemail system is often impossible, at least if this determination is to be made at the side of the telecommunication device. Little harm is done in case of a "false negative" determination, i.e., if the call unexpectedly reaches a voicemail system. The user then simply terminates the call. The user will need to pay the connection costs, but he or she will be no worse off than without using the present invention. A "false positive" determination is less desirable because it means that a call is automatically terminated even if the call would in fact have reached the called subscriber. In embodiments where a false positive determination may occur with more than negligible probability, the user should not employ the method of the present invention for important calls.

In some embodiments, the criterion for determining that the call is likely to reach a voicemail system is that the telecommunication device receives any kind of call forwarding notification from the network. Of course, use of this criterion is only practicable if the network issues call forwarding notifications to calling devices in at least some circumstances. As an alternative in some embodiments, the criterion may simply be a timeout event, i.e., that the call is not connected within a predetermined time interval.

In order to reduce the number of "false positive" determinations, some embodiments provide for at least one further test that is performed in response to receiving the call forwarding notification. The further test may comprise checking a call forwarding type stated in the call forwarding notification and/or analyzing a call forwarding target number contained in the call forwarding notification. In embodiments where a call forwarding target number is analyzed, the analyzing may comprise checking whether the call forwarding target number or a part thereof corresponds to a voicemail system number and/or the number of the called subscriber and/or a part of the number of the called subscriber.

In many embodiments, the telecommunication device is a mobile device having a wireless telecommunication function like, for example, a GSM telecommunication function and/or a UMTS telecommunication function.

The present invention also comprises a telecommunication device that may, in some embodiments, offer a standard call setup command and a modified call setup command, the latter initiating the call setup process of the present invention.

Another aspect of the present invention is a telecommunication network that supports or implements a determination whether or not an incoming call is forwarded to a voicemail system. If such a determination is made, the telecommunication network may notify the calling telecommunication device and/or automatically terminate the call before any connection is established. This embodiment has the advantage that the telecommunication network is usually in a position to determine the target of any call redirection with a high degree of reliability.

BRIEF DESCRIPTION

Reference is now made to the following descriptions taken in conjunction with the accompanying drawings, in which:

FIG. 1 (the single drawing FIGURE) shows a sample sequence diagram of a call setup process in accordance with an embodiment of the invention.

DETAILED DESCRIPTION

FIG. 1 shows a telecommunication device 10 that is adapted to communicate with a telecommunication network 12. In the embodiment of FIG. 1, the telecommunication device 10 is a mobile device like, for example, a mobile telephone or a mobile organizer having a wireless telecommunication function. The telecommunication device 10 communicates with the network 12 via an air interface. For example, the telecommunication device 10 and the network 12 may use the well-known GSM or UMTS standards or other wireless communication standards.

The network 12 comprises a voicemail system 14, which maintains at least one mailbox for each subscriber. In other embodiments, the voicemail system 14 may be external to, but accessible via, the network 12. A subscriber may activate his or her mailbox by registering and activating a call forwarding service of the network 12. The call forwarding service causes incoming calls that are directed to the subscriber's number to be forwarded to the subscriber's mailbox. The subscriber may choose one of a number of different types of call forwarding services, e.g., call forwarding unconditional (CFU), call forwarding on mobile subscriber busy (CFB), call forwarding on no reply (CFNRy), and call forwarding on mobile subscriber not reachable (CFNRc).

The call forwarding services described above and their use for directing incoming calls to a mailbox are well known. For example, the standard document 3GPP TS 24.082 ("Call Forwarding Supplementary Service"), Version 6.0.0, available from the European Telecommunication Standards Institute, Sophia Antipolis, France, specifies call forwarding operations in the context of GSM Phase 2+ and UMTS systems. This document also specifies that a user (served subscriber) can request that a calling subscriber whose call has been forwarded receives a corresponding notification. In GSM and UMTS systems, this notification is transmitted to the calling subscriber in the form of a NotifySS operation containing the type of the call forwarding service.

The process shown in FIG. 1 starts when a user of the telecommunication device 10 initiates a call to a subscriber. In the following description, it is assumed that the called subscriber has registered and activated a call forwarding service to his or her mailbox in the voicemail system 14. Furthermore, it is assumed that the network 12 is set up so that calling subscribers will be notified of any redirection of an outgoing call. As mentioned in the previous paragraph, this functionality is specified in the GSM/UMTS standard. There may also be other protocol layers or other features of the network 12 that allow the telecommunication device 10 to detect any call forwarding, and these layers or features may be used in some embodiments.

In order to initiate the call, the user first enters the telephone number of the called subscriber at a keypad 16 of the telecommunication device 10. Alternatively, the user may select a telephone number from a contacts list stored in the telecommunication device 10. The telecommunication device 10 then shows, on a display 18, the entered or selected telephone number and a menu with a plurality of possible user commands 20, 22, 24. These user commands include a standard call setup command 20, a modified call setup command 22, and a save number command 24.

The save number command 24 is used to store the displayed telephone number in the contacts list. The standard call setup command 20 dials the displayed number in the usual manner and establishes a connection either to the called subscriber or to his or her mailbox. This is the usual calling command customary in the prior art. The modified call setup command 22, however, is particular to the invention. In a manner that will be described in more detail below, the modified call setup command 22 initiates the call setup process, but terminates the process immediately—before any connection is established—if there is some indication that the call is likely to reach a voicemail system.

The embodiment shown in FIG. 1 and described above uses a menu with menu items that correspond to the available user commands 20, 22, 24. However, in some embodiments other or additional means for entering commands—in particular the modified call setup command 22—may be provided. For example, the user interface of the telecommunication device 10 may provide soft keys, i.e., variable function keys of the keypad 16 whose current function is shown in a section of the display 18 adjacent to the soft keys. In such embodiments, the modified call setup command 22 may be assigned to one of these soft keys at least temporarily. In other embodiments, the soft keys may also be implemented on a touch-sensitive display. Alternatively or additionally, the telecommunication device 10 may be equipped with a voice command recognition functionality that is known as such. The voice command recognition functionality recognizes certain words spoken by the user as commands, for example, as the modified call setup command 22.

Step 26 shown in FIG. 1 signifies that the user gives the modified call setup command 22 by a menu selection or by any of the other command entry means discussed above. The telecommunication device 10 then initiates a call setup process 28. The call setup process 28 begins by an exchange of various call setup communications 30 between the telecommunication device 10 and the network 12. This part of the call setup process 28 is customary in the prior art and is defined in the applicable standards, e.g., the GSM/UMTS standards.

As stated above, the sample sequence of FIG. 1 assumes that the called subscriber has activated a call forwarding service to his or her mailbox, and that the network 12 has been set up to send a call forwarding notification to the calling device whenever a call is forwarded. Therefore, the network 12 now forwards the user's call to the voicemail system 14 and sends the corresponding call forwarding notification 32 to the telecommunication device 10.

Upon receipt of the call forwarding notification 32, the telecommunication device 10 performs at least one test 34 in order to determine whether the call forwarding notification 32 signifies that the call will likely be forwarded to a mailbox—and not to another fixed line or mobile number of the called subscriber. In different embodiments, various different kinds of tests 34 can be performed, depending on the information contained in the call forwarding notification 32 and on other circumstances. Some of the possibilities will be described in detail below.

If the test 34 results in the finding that the call forwarding target is probably a mailbox of the voicemail system 14—this is assumed to be case in the sample sequence of FIG. 1—, then the telecommunication device 10 terminates the call setup process 28 and sends a corresponding call termination message 36 to the network 12. In other words, the telecommunication device 10 immediately "hangs up." This is done preferably before any connection is made, so that connection charges are avoided. However, the invention has benefits even if the call forwarding notification 32 is received late and the call is only terminated after it has been connected to the mailbox since, in this case, the chargeable connection time will be very short.

After terminating the call setup process 28, the telecommunication device 10 notifies the user in step 38. This user notification may comprise a suitable message shown on the display 18. The user then knows that the call was judged as likely to reach a mailbox so that the user can call again later.

As mentioned above, there are various possibilities for determining whether or not the call will likely reach the voicemail system 14. In a very simple embodiment, receipt of any call forwarding notification 32 from the network 12 will cause the telecommunication device 10 to terminate the call setup process 28. In other words, no additional test 34 is performed. This embodiment may cause "false positive" results, but it may still be useful in systems in which the call forwarding notification 32 comprises no or no significant additional information.

If the call forwarding notification 32 contains an indication of the type of the invoked call forwarding service, then this indication may be used in the test 34. For example, it may be judged that only the types call forwarding on mobile subscriber busy (CFB), call forwarding on no reply (CFNRy), and call forwarding on mobile subscriber not reachable (CFNRc) indicate that the call will likely reach the voicemail system 14. The telecommunication device 10 therefore terminates the call setup process 28 only if the received call forwarding notification 32 signifies one of these call forwarding types. If the notification 32 indicates a call forwarding unconditional (CFU) service, then it can be assumed that the call is forwarded to another fixed line or mobile number of the called subscriber, and the call setup process 28 will not be terminated.

It is also possible in some systems that the call forwarding notification 32 indicates the call forwarding target number, i.e., the number to which the forwarded call is directed. The telecommunication device 10 can then analyze in test 34 whether or not the call forwarding target number signifies a mailbox in the voicemail system 14. The details may depend on the particular network operator or service provider, and different tests 34 may be performed for different network operators or service providers.

For example, in some networks 14 a mailbox number may comprise a network operator prefix, a voicemail system number, and the number of the called subscriber. Taking the called number +49-177-12345678 shown in FIG. 1 as an example, the corresponding mailbox number may read +49-177-99-12345678. The telecommunication device 10 can then check in test 34 whether the call forwarding target number contains the voicemail system number 99, and/or whether the trailing portion of the call forwarding target number is identical to the trailing portion of the called number.

In further embodiments, the test 34 may comprise a check whether or not the call forwarding target number contains (or consists of) a certain voicemail system number. As this number may be specific to the individual network operators or service providers, the telecommunication device 10 may contain a lookup table associating, for example, each network operator prefix with the corresponding voicemail system number. In the above example, the lookup table may indicate that the operator prefix 177 corresponds to the voicemail system number 99. The telecommunication device 10 then extracts the operator prefix from the called number, determines one or more associated voicemail system number(s), and tests whether the call forwarding target number stated in a received call forwarding notification 32 contains or consists of (one of) the operator's voicemail system number(s).

It is also possible that the network 12 does not or not reliably issue any call forwarding notifications even if call forwarding takes place. In embodiments that are adapted to such networks 12, the test 34 can be a simple timeout check that is performed even if no call forwarding notification 32 is received. The telecommunication device 10 will then terminate the call setup process 28 if no connection has been established within a certain time interval.

While the previous paragraph envisaged a non-cooperating network 12, it is also possible that a network 12 is specifically adapted to support or even implement the functionality of the invention. Such a network 12 will automatically determine whether or not an incoming call is forwarded to the voicemail system 14. If a call forwarding to the voicemail system 14 is detected, the network 12 will notify the telecommunication device 10 accordingly. Since the network has full access to its internals, any "call forwarded to mailbox" notification issued by the network 12 will usually be reliable, and the telecommunication device 10 can immediately terminate the call without performing any additional tests. In further embodiments, the network 12 may be configured to automatically terminate any calls forwarded to a mailbox, provided that the network 12 was informed during the call setup communications 30 that the user selected the modified call setup command 22.

The applicability and merits of the various embodiments described above depend on the type and functionality of the network 12, in particular on the setting of the network 12 with respect to the issuing of call forwarding notifications. It is therefore also envisaged in some embodiments to equip the telecommunication device 10 with a number of different strategies for determining whether or not an outgoing call is likely to reach the voicemail system 14. The particular strategy or strategies to be used can then be selected automatically—depending on the type of the network 14 and/or the network operator and/or the service provider—or manually by the user.

Those skilled in the art to which this application relates will appreciate that other and further additions, deletions, substitutions and modifications may be made to the described embodiments.

What is claimed is:

1. A method for controlling a call setup process in a telecommunication device, wherein the telecommunication device is a mobile communication device, the method comprising:
   receiving at the mobile communication device a user command to set up a call;
   initiating the call setup process;
   determining at the mobile communication device that the call is likely to reach a voicemail system, wherein the mobile communication device determines that the call is likely to reach a voicemail system upon receiving a call forwarding notification; and
   in response to the determination that the call is likely to reach the voicemail system, the mobile communication device automatically terminating the call setup process without any user input.

2. The method according to claim 1, wherein the telecommunication device automatically terminates the call setup process before any connection is established.

3. The method according to claim 1, wherein the telecommunication device notifies the user after terminating the call setup process.

4. The method according to claim 1, wherein the mobile communication device has a wireless telecommunication function, and wherein said telecommunication function is at least one of a GSM telecommunication function and a UMTS telecommunication function.

5. A method for controlling a call setup process in a telecommunication device, wherein the telecommunication device is a mobile communication device, the method comprising:
   receiving at the mobile communication device a user command to set up a call;
   initiating the call setup process;
   determining, at the mobile communication device, that the call is likely to reach a voicemail system, wherein the telecommunication device determines that the call is likely to reach a voicemail system upon receiving a call forwarding notification that passes at least one test performed by the telecommunication device; and
   in response to the determination that the call is likely to reach the voicemail system, the mobile communication device automatically terminating the call setup process without any user input.

6. The method according to claim 5, wherein the telecommunication device automatically terminates the call setup process before any connection is established.

7. The method according to claim 5, wherein the at least one test comprises checking a call forwarding type stated in the call forwarding notification.

8. The method according to claim 5, wherein the at least one test comprises analyzing a call forwarding target number contained in the call forwarding notification.

9. The method according to claim 8, wherein the analyzing comprises checking whether the call forwarding target number or a part thereof corresponds to a voicemail system number.

10. The method according claim 8, wherein the analyzing comprises checking whether the call forwarding target number contains the number of the called subscriber or a part of the number of the called subscriber.

11. The method according to claim 5, wherein the telecommunication device notifies the termination of the call setup process to the user.

12. The method according to claim 5, wherein the mobile communication device has a wireless telecommunication function, and wherein said telecommunication function is at least one of a GSM telecommunication function and a UMTS telecommunication function.

13. A telecommunication device that is adapted for controlling a call setup process, wherein the telecommunication device is a mobile communication device, and wherein:
   the mobile communication device is configured to receive a user command to set up a call;
   the mobile communication device is configured to initiate the call setup process in response to receiving the user command;
   the mobile communication device is configured to determine that the call is likely to reach a voicemail system, wherein the telecommunication device determines that the call is likely to reach a voicemail system upon receiving a call forwarding notification; and
   the mobile communication device is configured to automatically terminate the call setup process, without any user input, before any connection is established in response to the determination that the call is likely to reach the voicemail system.

14. The telecommunication device according to claim 13, wherein the telecommunication device offers a standard call setup command and a modified call setup command, the modified call setup command initiating the call setup process.

15. A telecommunication device that is adapted for controlling a call setup process, wherein the telecommunication device is a mobile communication device, and wherein:
   the mobile communication device is configured to receive a user command to set up a call;
   the mobile communication device is configured to initiate the call setup process in response to receiving the user command;
   the mobile communication device is configured to determine that the call is likely to reach a voicemail system, wherein the telecommunication device determines that the call is likely to reach a voicemail system upon receiving a call forwarding notification that passes at least one test performed by the telecommunication device; and
   the mobile communication device is configured to automatically terminate the call setup process, without any user input, before any connection is established in response to the determination that the call is likely to reach the voicemail system.

16. The telecommunication device according to claim 15, wherein the telecommunication device offers a standard call setup command and a modified call setup command, the modified call setup command initiating the call setup process.

17. The method according to claim 1, wherein the call forwarding notification indicates the call forwarding target number.

18. The method according to claim 5, wherein the call forwarding notification indicates the call forwarding target number.

19. The telecommunications device according to claim 13, wherein the call forwarding notification indicates the call forwarding target number.

20. The telecommunications device according to claim 15, wherein the call forwarding notification indicates the call forwarding target number.

* * * * *